(12) United States Patent
Ono

(10) Patent No.: US 7,496,775 B2
(45) Date of Patent: Feb. 24, 2009

(54) INFORMATION PROCESSING APPARATUS AND INFORMATION PROCESSING METHOD FOR AUTONOMOUSLY CONTROLLING THE SUPPLY OF ELECTRIC POWER

(75) Inventor: Yoshiyuki Ono, Hino (JP)

(73) Assignee: Seiko Epson Corporation (JP)

( * ) Notice: Subject to any disclaimer, the term of this patent is extended or adjusted under 35 U.S.C. 154(b) by 423 days.

(21) Appl. No.: 11/301,757

(22) Filed: Dec. 13, 2005

(65) Prior Publication Data

US 2006/0129251 A1    Jun. 15, 2006

(30) Foreign Application Priority Data

Dec. 15, 2004    (JP)    .............................. 2004-362539

(51) Int. Cl.
*G06F 1/32*    (2006.01)

(52) U.S. Cl. ...................................... 713/323; 713/324

(58) Field of Classification Search ................. 713/323, 713/324

See application file for complete search history.

(56) References Cited

U.S. PATENT DOCUMENTS

| | | | |
|---|---|---|---|
| 5,737,613 | A | 4/1998 | Mensch, Jr. |
| 6,140,714 | A | 10/2000 | Fujii |
| 6,307,281 | B1 | 10/2001 | Houston |
| 6,345,362 | B1 | 2/2002 | Bertin et al. |
| 6,535,985 | B1 | 3/2003 | Oshima et al. |
| 6,782,483 | B2 | 8/2004 | Oshima et al. |
| 6,789,207 | B1 * | 9/2004 | Maejima ..................... 713/322 |
| 6,792,552 | B2 | 9/2004 | Oshima et al. |
| 6,795,929 | B2 | 9/2004 | Oshima et al. |
| 6,802,014 | B1 | 10/2004 | Suurballe |
| 6,804,791 | B2 | 10/2004 | Oshima et al. |
| 6,839,855 | B2 | 1/2005 | Oshima et al. |
| 6,882,389 | B2 | 4/2005 | Oshima et al. |
| 6,909,483 | B2 | 6/2005 | Oshima et al. |
| 6,941,481 | B2 | 9/2005 | Oshima et al. |
| 6,952,248 | B2 | 10/2005 | Oshima et al. |
| 6,952,787 | B2 | 10/2005 | Oshima et al. |

(Continued)

FOREIGN PATENT DOCUMENTS

JP    04-211819    8/1992

(Continued)

OTHER PUBLICATIONS

Communication from Taiwan Patent Office regarding counterpart application (and English translation thereof).

*Primary Examiner*—Thuan N Du
(74) *Attorney, Agent, or Firm*—Harness, Dickey & Pierce, P.L.C.

(57) ABSTRACT

An information processing apparatus for autonomously controlling the supply of electric power to each functional unit constituting said apparatus includes a management part for controlling the supply of electric power to each functional unit; an execution control part for issuing an instruction concerning an operation, if the operation is required in the self apparatus; and an instruction recording part for recording an instruction issued by said execution control part; wherein said management part stops the supply of electric power to said execution control part and starts the supply of electric power to said functional unit concerning the instruction issued by said execution control part, if said execution control part ends issuing the instruction, whereby said functional unit executes the instruction recorded in said instruction recording part.

8 Claims, 9 Drawing Sheets

U.S. PATENT DOCUMENTS

| | | | |
|---|---|---|---|
| 6,971,037 | B2 | 11/2005 | Oshima et al. |
| 6,990,595 | B2 | 1/2006 | Oshima et al. |
| 7,006,181 | B2 | 2/2006 | Oshima et al. |
| 7,024,572 | B2 | 4/2006 | Oshima et al. |
| 7,062,666 | B2 * | 6/2006 | Maher et al. ............ 713/324 |
| 7,062,667 | B2 | 6/2006 | Oshima et al. |
| 7,073,084 | B2 | 7/2006 | Oshima et al. |
| 7,079,108 | B2 | 7/2006 | Oshima et al. |
| 7,080,272 | B2 | 7/2006 | Oshima et al. |
| 7,120,809 | B2 | 10/2006 | Oshima et al. |
| 7,137,021 | B2 * | 11/2006 | Dhong et al. ............ 713/324 |
| RE39,523 | E | 3/2007 | Fujii |
| 7,213,162 | B2 | 5/2007 | Oshima et al. |
| 7,432,921 | B2 | 10/2008 | Oshima et al. |
| 2002/0147005 | A1 | 10/2002 | Tezuka et al. |
| 2003/0079152 | A1 | 4/2003 | Triece |
| 2003/0193466 | A1 | 10/2003 | Oshima et al. |
| 2003/0196129 | A1 | 10/2003 | Lin |
| 2005/0128176 | A1 | 6/2005 | Oshima et al. |
| 2005/0128177 | A1 | 6/2005 | Oshima et al. |
| 2005/0128179 | A1 | 6/2005 | Oshima et al. |
| 2005/0168400 | A1 | 8/2005 | Oshima et al. |
| 2007/0028086 | A1 | 2/2007 | Oshima et al. |
| 2007/0061560 | A1 | 3/2007 | Oshima et al. |
| 2007/0061604 | A1 | 3/2007 | Oshima et al. |
| 2007/0136566 | A1 | 6/2007 | Oshima et al. |

FOREIGN PATENT DOCUMENTS

| | | |
|---|---|---|
| JP | 11-265234 | 9/1999 |
| JP | 2000-163174 | 6/2000 |
| JP | 2000-315127 | 11/2000 |
| JP | 2002-268778 | 9/2002 |
| JP | 2004-206530 | 7/2004 |
| JP | 2004-295193 | 10/2004 |
| KR | 1999-0073440 | 10/1999 |
| TW | 594466 | 6/2004 |
| WO | WO00/02118 | 11/2000 |
| WO | WO 03/017075 | 2/2003 |

* cited by examiner

*FIG. 3*

| RecStart(BufferAddress) | |
|---|---|
| API MODE | START THE RECORDING MODE<br>THE RECORDED INSTRUCTION IS STORED FROM BufferAddress<br>BufferAddress INDICATES THE ADDRESS ON NVRAM 40 |
| RECORDING MODE | NOT USED |

| RecEnd() | |
|---|---|
| API MODE | NOT USED |
| RECORDING MODE | END THE RECORDING MODE |

| InitScreen() | |
|---|---|
| API MODE | INITIALIZE THE SCREEN |
| RECORDING MODE | RECORD THE INSTRUCTION CODE(0x01) FOR INITIALIZING THE SCREEN |

| DrawLine(StartX, StartY, EndX, EndY) | |
|---|---|
| API MODE | DRAW THE LINE CONNECTING THE COORDINATES(StartX, StartY)<br>AND COORDINATES(EndX, EndY) |
| RECORDING MODE | RECORD THE INSTRUCTION CODE(0x02, StartX, StartY, EndX, EndY)<br>FOR DRAWING THE LINE CONNECTING THE COORDINATES(StartX, StartY)<br>AND COORDINATES(EndX, EndY) |

| GPUHalt() | |
|---|---|
| API MODE | STOP THE GPU AND POWER OF GPU |
| RECORDING MODE | STOP THE GPU AND RECORD THE INSTRUCTION CODE(0xFF) FOR<br>STOPPING THE POWER OF GPU |

| GPUStart(BufferAddress) | |
|---|---|
| API MODE | INSTRUCT THE GPU TO INTERPRET AND EXECUTE THE DRAWING<br>INSTRUCTION<br>THE DRAWING INSTRUCTION IS STORED IN THE BUFFER STARTING FROM<br>BufferAddress<br>BufferAddress INDICATES THE ADDRESS ON NON-VOLATILE MEMORY |
| RECORDING MODE | NOT USED |

| CPUHalt() | |
|---|---|
| API MODE | STOP THE CPU AND POWER OF CPU |
| RECORDING MODE | NOT USED |

| GPUPowerOn() | |
|---|---|
| API MODE | TURN ON THE POWER OF GPU |
| RECORDING MODE | NOT USED |

PRESENT INVENTION

WHERE →  ENERGIZED AND OPERATION STATE
NO ARROW  POWER SUPPLY STOP STATE

①ISSUING INSTRUCTION  ②START OF G A
③DRAWING PROCESS  ④AFTER DRAWING PROCESS

INFORMATION PROCESSING APPARATUS AND INFORMATION PROCESSING METHOD FOR AUTONOMOUSLY CONTROLLING THE SUPPLY OF ELECTRIC POWER

The entire disclosure of Japanese Patent Application No. 2004-362539, filed Dec. 15, 2004, is expressly incorporated by reference herein.

BACKGROUND OF THE INVENTION

1. Field of the Invention

The present invention relates to an information processing apparatus and an information processing method for autonomously controlling the supply of electric power to the inside of the apparatus.

2. Description of the Related Art

Recently, in the field of computer system techniques, a power control technique has been developed for stopping the supply of electric power to the inside of the apparatus while there is no process, and resuming the supply of electric power instantaneously when the process is required such as when an input operation for the apparatus is performed, thereby reducing the power consumption on standby.

For instance, in a portable apparatus such as a PDA (Personal Digital Assistant), if no operation is performed for a fixed period of time, the apparatus automatically transits to a low power consumption mode in which the CPU operates at a low frequency and the supply of power to the peripheral circuits is stopped, and if any operation is performed, the apparatus returns to a normal state to perform the process, thereby reducing the power consumption on standby.

Also, a technique concerning a power saving method for stopping the power supply while the device is not in use was described in JP-A-2004-206530.

JP-A-2004-206530 is an example of related art.

SUMMARY

However, in the prior arts including the technique as described in JP-A-2004-206530, if the process was required because any operation was performed, it was required that a control part such as the CPU for issuing the instruction was always operable until the process was ended.

And since the control part such as the CPU has a great power consumption, it was difficult to reduce the power consumption once the apparatus started the operation.

It is an object of the invention to provide an information processing apparatus that can autonomously control the supply of electric power in which a lower power consumption is realized.

In order to accomplish the above object, the present invention provides an information processing apparatus for autonomously controlling the supply of electric power to each functional unit constituting the apparatus, comprising a management part (e.g., power management circuit 10 of FIG. 2) for controlling the supply of electric power to each functional unit (e.g., each functional unit of FIG. 2), an execution control part (e.g., CPU 20 of FIG. 2) for issuing an instruction concerning an operation, if the operation is required in the self apparatus, and an instruction recording part (e.g., NVRAM 40 of FIG. 2) for recording an instruction issued by the execution control part, wherein the management part stops the supply of electric power to the execution control part and starts the supply of electric power to the functional unit concerning the instruction issued by the execution control part, if the execution control part ends issuing the instruction, whereby the functional unit executes the instruction recorded in the instruction recording part.

With this configuration, if an operation is required in the information processing apparatus, the execution control part ends operation upon the end of issuing an instruction concerning the required operation even when the processing is performed in another functional unit.

Accordingly, the operation time of the execution control part comprising the CPU with a great power consumption is shortened, whereby the information processing apparatus has a lower power consumption than the conventional technique for low power consumption.

Also, the instruction recording part comprises a non-volatile memory that holds the recorded information to be non-volatile.

With this configuration, after the execution control part stops operation, the issued instruction can be held at low power consumption.

Also, the execution control part executes the operation via an application program interface of the built-in basic software by switching a recording mode in which the issued instruction is recorded in the instruction recording part and an API mode in which the issued instruction is sequentially executed in the functional unit in accordance with a designation.

With this configuration, the apparatus transits to the recording mode with lower consumption power only by switching the modes, without changing the application program interface to instruct the operation.

Accordingly, the apparatus can be easily employed by the application program or user.

Also, in supplying electric power to the functional unit concerning the instruction issued by the execution control part, the management part performs a power-on sequence starting the supply of electric power to the functional unit, supplying a clock to the functional unit after the supply of electric power is stabilized, changing a reset signal indicating the possibility of the operation to the functional unit into a state (e.g., a high-level state) where the operation is permitted, and subsequently inputting a control signal instructing the execution of the process into the functional unit, the functional unit comprises a READY signal transmitting means for transmitting a READY signal indicating that the functional unit is ready to perform the process after the reset signal is changed to the state where the operation is permitted by the management part, and the management part changes the reset signal for the functional unit concerning the instruction issued by the execution control part to the state where the operation is permitted in the power-on sequence, then inputs the control signal into the functional unit upon receiving the READY signal from the READY signal transmitting means provided in the functional unit, and stops the supply of electric power to the functional unit upon the end of the process.

With this configuration, the information processing apparatus is fundamentally in a state where no electric power is supplied to each functional unit, and has electric power supplied to perform the process only if the operation is required. At this time, a power-on sequence through the supply of electric power, supply of clock and release of reset is performed, and in the power-on sequence, a READY signal is outputted if the operation is possible in each functional unit.

Accordingly, the state where the power of each functional unit is shut off is fundamental, and even if the power is turned on or off repeatedly upon the input operations, the waiting time from turning on the power to starting the process can be shortened, and the process is performed more rapidly.

Also, the management part is fundamentally in a state where no electric power is supplied to each of the functional units including the execution control part, in which if the process in any of the functional units is required, the power-on sequence is performed for the execution control part, and if the execution control part ready for execution of the process issues an instruction to other functional units, the power-on sequence is performed for the functional unit of concern.

With this configuration, after the power of the execution control part supplied with no electric power is turned on, the execution control part can start or stop the supply of electric power to the functional unit requiring the process at an appropriate timing, whereby the process becomes more efficient.

A plurality of power management domains comprising the predetermined functional units are made up as control units for supplying the electric power, and if the process in predetermined functional unit is required, the management part supplies electric power to every power management domain comprising the functional unit.

With this configuration, the functional units that are functionally closely related, such as the functional units possibly operating at the same time or performing one series of processes can be collectively placed in the executable state in performing the process, whereby the process can be performed more rapidly than the power-on sequence is performed in order for each functional unit.

Also, the invention provides an information processing method for autonomously controlling the supply of electric power to each functional unit constituting the apparatus, comprising issuing an instruction concerning an operation and recording the issued instruction, if the operation is required in the self apparatus, and stopping the supply of electric power to the functional unit issuing the instruction upon the end of issuing the instruction, and starting the supply of electric power to the functional unit concerning the issued instruction to perform the instruction recorded in the functional unit.

In this way, with the invention, the information processing apparatus that can autonomously control the supply of electric power has a lower power consumption.

BRIEF DESCRIPTION OF THE DRAWINGS

FIG. 3 is a view showing the operation contents according to various API modes.

DETAILED DESCRIPTION OF THE PREFERRED EMBODIMENTS

The embodiments of an information processing apparatus according to the invention will be described below with reference to the drawings.

First of all, the constitution will be described below.

Figure 1:
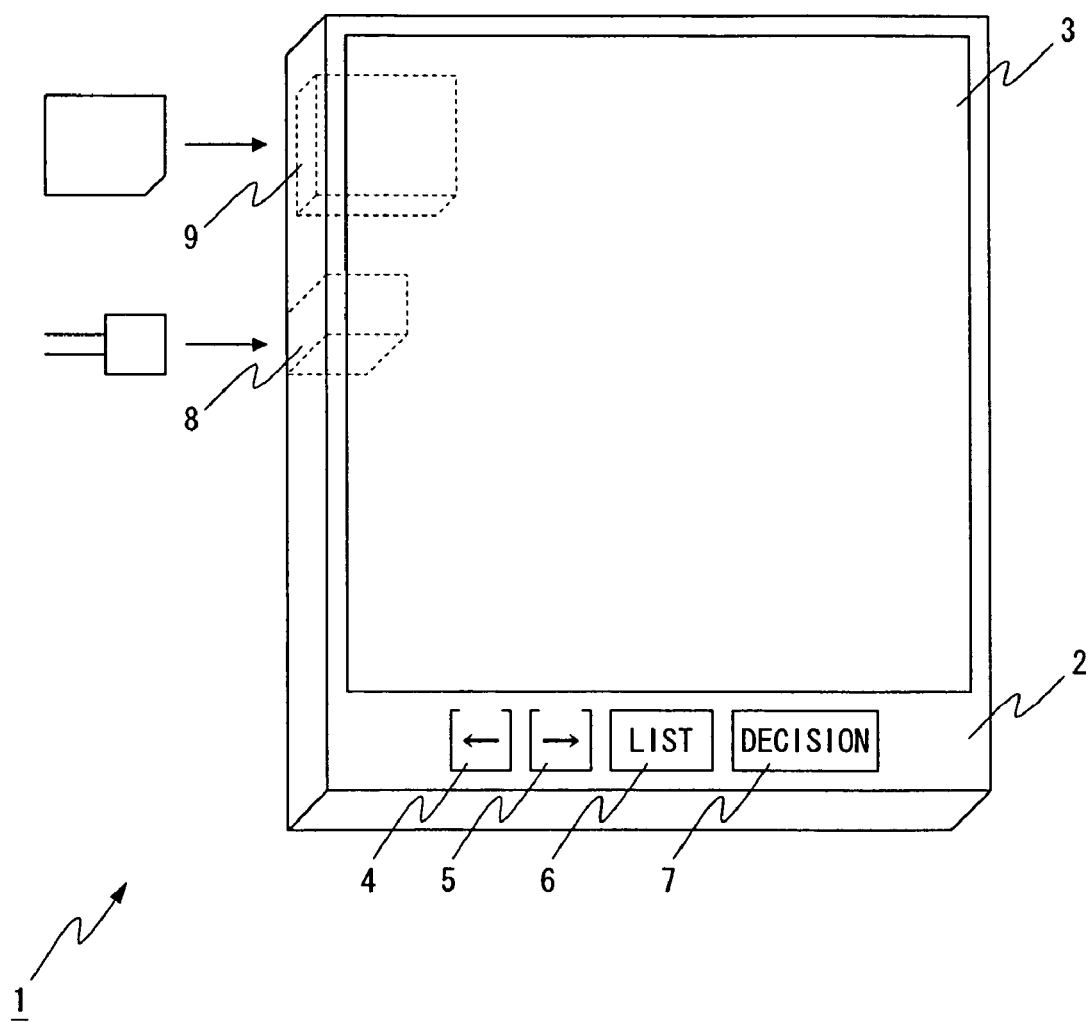
FIG. 1 is a view showing the appearance of an information processing apparatus 1 according to the present invention.

FIG. 1 is a view showing the appearance of the information processing apparatus 1 according to the invention.

In this embodiment, the information processing apparatus 1 is constituted as an electronic book reader for reading the contents of an electronic book.

In FIG. 1, the information processing apparatus 1 comprises a main body 2, a display 3, a page backward button 4, a page forward button 5, a list display button 6, a decision button 7, a communication connector 8, and a memory card slot 9.

The main body 2 has various functional units making up the information processing apparatus 1, and comprises the display 3, the page backward button 4, the page forward button 5, the list display button 6, and the decision button 7 on a front face, and the communication connector 8 and the memory card slot 9 on a left side face. Also, the main body 2 has the devices such as a CPU 20 and a display controller 70 for implementing various functions.

The display 3 is constituted of a display device having a high pixel density (multiple pixels) and A4 size, and displays the pixel data at predetermined pixels under the control of the display controller 70.

Also, the display 3 is a display device with memory (the display screen is kept after the power is, turned off). Therefore, since the power is unnecessary to keep the state of the display screen, the information processing apparatus 1 has a lower power consumption.

The display 3 may be, for example, an electrophoresis display, a cholesteric liquid crystal display, a display employing the charged toner, a display employing twist ball, or an electro-deposition display.

The page backward button 4 is the button for returning the page currently displayed, and the page forward button 5 is the button for forwarding the page currently displayed.

The list display button 6 is the button for displaying the list of pages included in the contents stored in the memory card. The contents stored in the memory card are data concerning the reduced screen of each page (hereinafter referred to as a "reduced screen data") as the page for list display.

The decision button 7 is the button for selecting the page that the user displays on the entire screen.

A depressing signal of the page backward button 4, the page forward button 5, the list display button 6 and the decision button 7 is inputted via a power management circuit 10 into the CPU 20.

The communication connector 8 is the connector for connecting a USB (Universal Serial Bus) cable, and the transmission or reception of information or the supply of electric power is enabled via the connected communication cable.

The memory card slot 9 is the interface for reading or writing data from or into the memory card, in which the contents stored in the memory card can be read by mounting a memory card storing the contents of electronic book.

The internal configuration of the information processing apparatus 1 will be described below.

Figure 2:
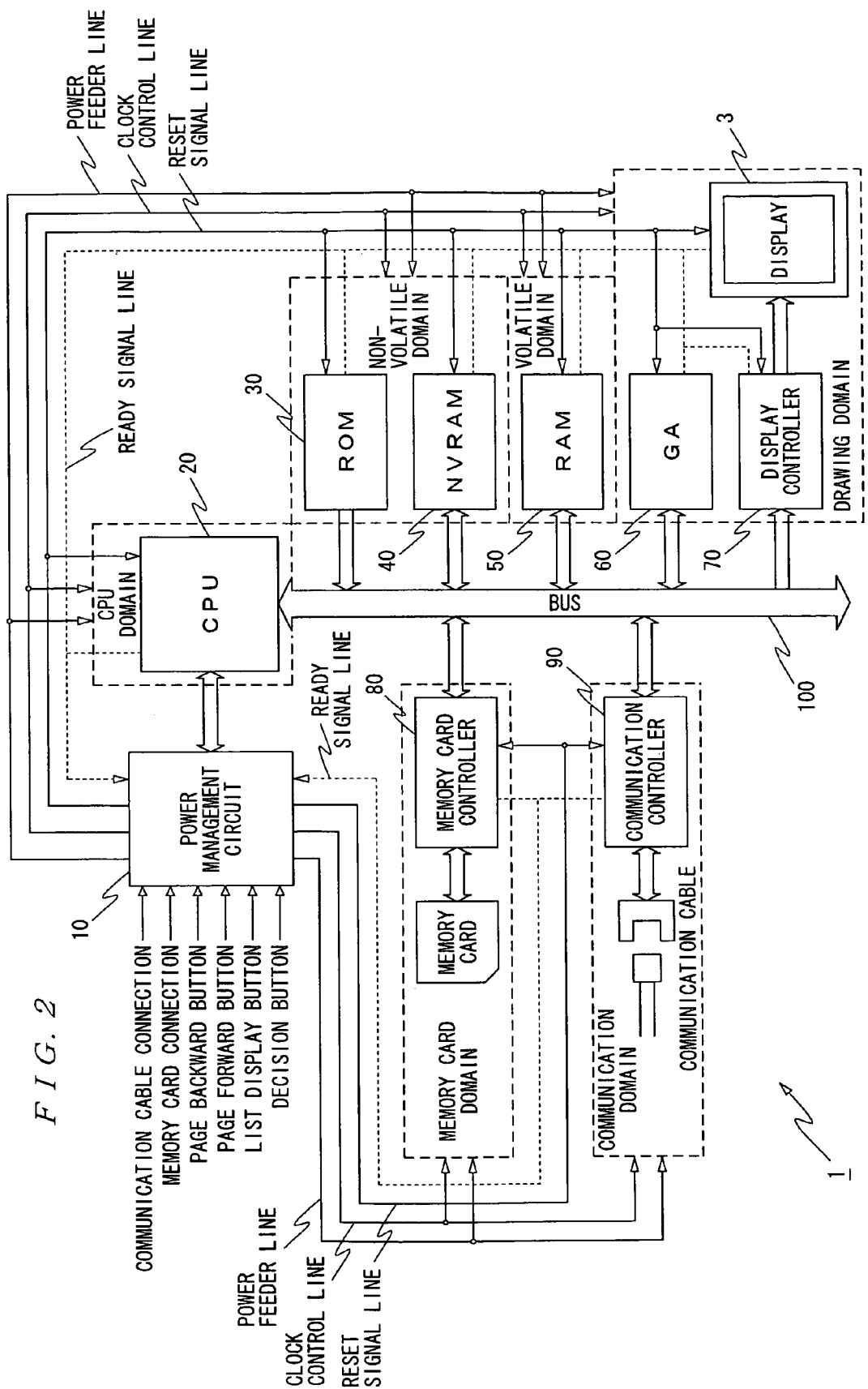
FIG. 2 is a functional block diagram showing the internal configuration of the information processing apparatus 1.

FIG. 2 is a functional block diagram showing the internal configuration of the information processing apparatus 1.

In FIG. 2, the information processing apparatus 1 comprises the power management circuit 10, the CPU 20, a ROM (Read Only Memory) 30, an NVRAM 40, a RAM 50, a graphic accelerator (hereinafter referred to as "GA") 60, a display controller 70, a memory card controller 80, and a communication controller 90. These functional units expect for the power management circuit 10 are connected via a bus 100, and the power management circuit 10 is directly connected to the CPU 20. Also, the power management circuit 10 is connected to a power management domain (as will be described later) via a power feeder line supplying the electric power. Further, the power management circuit 10 is connected to each functional unit via a clock control line, a reset signal line and a READY signal line.

Each functional unit in the information processing apparatus 1 constitutes a plurality of groups concerning the supply of electric power. To begin with, this group (hereinafter referred to as a "power management domain") will be described below.

The information processing apparatus 1 according to the invention basically lies in a state where no electric power is supplied to the functional units, and performs the power control to supply electric power to perform the process, only when the operation is required, and stop the supply of electric power again after the end of the process.

At this time, to perform the process according to an input instruction, the functionally closely related functional units such as functional units having possibility of operating at the same time or functional units making a series of processes are included in the same power management domain, in which the supply of electric power is controlled independently of other power management domains.

In this way, the power control is performed by including the functionally closely related functional units in the same power management domain, to deal with each of the functional units, which is beneficial in respect of the circuit scale and the control easiness.

In the functional configuration as shown in FIG. 2, from the above point of view, a CPU domain comprising the CPU 20, a non-volatile domain comprising the ROM 30 and the NVRAM 40, a volatile domain comprising the RAM 50, a drawing domain comprising the GA 60, the display controller 70 and the display 3, a memory card domain comprising the memory card controller 80, and a communication domain comprising the communication controller 90 are formed, and the power management circuit 10 controls the power feed with each domain as a unit.

Subsequently, each functional unit as shown in FIG. 2 will be described below.

The power management circuit 10 receives electric power supplied from a battery, not shown, and supplies electric power to a predetermined power management domain.

Specifically, the power management circuit 10 supplies electric power to the CPU 20 in which the supply of electric power is stopped upon receiving a depressing signal of the page backward button 4, the page forward button 5, the list display button 6 and the decision button 7, or a detection signal of the connection of a communication cable at the communication connector 8 or a memory card in the memory card slot 9. And the power management circuit 10 sends a signal indicating any event (hereinafter referred to as an "event notification signal") including depressing the button, connecting the communication cable or connecting the memory card to the CPU 20 that is operable by resuming the supply of electric power.

Also, the power management circuit 10 supplies electric power to the power management domain, if the supply of electric power to any power management domain is required because of depressing the button, and stops the supply of electric power to the power management domain if the supply of electric power to the power management domain is unnecessary.

Herein, if it is required that each functional unit performs a process, the power management circuit 10 firstly supplies electric power to the power management domain including the functional unit, subsequently supplies the clock, further releases the reset signal, and outputs a control signal for instructing the functional unit to perform the process. As the method for outputting the control signal instructing the functional unit to perform the process, the power management circuit 10 outputs the control signal or the CPU 20 outputs the control signal upon receiving an event notification signal.

At this time, the power management circuit 10 starts the supply of clock, waiting for a predetermined time Ta until the power level is stabilized after starting the supply of electric power.

Also, the power management circuit 10 releases the reset, waiting for a predetermined time Tb until the state of clock is stabilized after starting the supply of clock. The reset signal relies on a negative logic. The reset occurs to disable the operation in the low level, while the reset is released to enable the operation in the high level.

Furthermore, in principle, the power management circuit 10 outputs a control signal, waiting for a predetermined time Tc until the initialization of each functional unit is ended after releasing the reset. Each functional unit becomes operable earlier than scheduled, and if a READY signal indicating that the preparation for performing the process is completed is received, it outputs the control signal upon receiving the READY signal as will be described later.

The power management circuit 10 is, for example, a small-sized FPGA (Field Programmable Gate Array) operating at low clocks, and may be constituted by the hardware having a lower power consumption than the CPU 20. With this constitution, if electric power is always supplied to the power management circuit 10 alone, it is unnecessary to supply electric power to the CPU 20 having generally a great power consumption at any time.

The CPU 20 controls the whole of the information processing apparatus 1 and reads and performs various kinds of program stored in the ROM 30. For example, the CPU 20 reads and performs a program for various kinds of processing in a system control process of the information processing apparatus 1 from the ROM 30 upon various kinds of signal inputted via the power management circuit 10.

At this time, the CPU 20 calls an API (Application Program Interface) of an OS (Operating system) to perform various kinds of instruction in the system control process. And the CPU 20 stores various kinds of processing result in a predetermined area of the NVRAM 40 or RAM 50.

Herein, the API of the OS built into the information processing apparatus 1 has a recording mode in which the apparatus operates with low power consumption and an API mode in which the apparatus operates with normal supply of power, in which the operation corresponding to each mode is defined for each instruction. The CPU 20 performs the operation corresponding to each API according to the selected mode.

FIG. 3 is a view showing the operation substance according to the mode of each API.

In FIG. 3, for the API, the operations "RecStart", "RecEnd", "InitScreen", "DrawLine", "GPUHalt", "GPUStart", "CPUHalt", and "GPUPowerOn" are defined.

"RecStart" is the API for transiting to the recording mode, with the address (BufferAddress) of the NVRAM 40 as the argument. If "RecStart" is performed in the API mode, the CPU 20 transfers the state of the information processing apparatus 1 to the recording mode, where the address (BufferAddress) of the NVRAM 40 is designated. In the recording mode, "RecStart" is not employed.

"RecEnd" is the API for ending the recording mode and transiting to the API mode. In the API mode, "RecEnd" is not employed.

"InitScreen" is the API for initializing the screen (display 3). If "InitScreen" is performed in the API mode, the CPU 20 initializes the screen (display 3). Also, if "InitScreen" is performed in the recording mode, the CPU 20 records an instruction code (here "0x01") for initializing the screen in the NVRAM 40.

"DrawLine" is the API for drawing the straight line, with the x, y coordinates (StartX, StartY) of the start point of the line and the x, y coordinates (EndX, EndY) of the end point of the line as the arguments. If "DrawLine" is performed in the API mode, the CPU 20 draws the line connecting the coordinates (StartX, StartY) and the coordinates (EndX, EndY) on the screen. Also, if "DrawLine" is performed in the recording mode, the CPU 20 records an instruction code (here "0x02, StartX, StartY, EndX, EndY") of drawing the line connecting the coordinates (StartX, StartY) and the coordinates (EndX, EndY) on the screen in the NVRAM 40.

"GPUHalt" is the API for stopping the supply of electric power to the drawing domain. If "GPUHalt" is performed in the API mode, the CPU 20 stops the operation of each part constituting the drawing domain, and the supply of electric power to the drawing domain. Also, if "GPUHalt" is performed in the recording mode, the CPU 20 records an instruction code (herein "0xFF") stopping the operation of each part constituting the drawing domain and stopping the supply of electric power to the drawing domain in the NVRAM 40.

"GPUStart" is the API for enabling the GA 60 to start to interpret and perform the instruction. If "GPUStart" is performed in the API mode, the CPU 20 instructs the GA 60 to interpret and perform the instruction code recorded in the NVRAM 40. The instruction code performed at this time is sequentially recorded by the CPU 20 in an area of NVRAM 40 with a predetermined address (BufferAddress) as the initial address. In the recording mode, "GPUStart" is not employed.

"CPUHalt" is the API for stopping the supply of electric power to the CPU domain. If "CPUHalt" is performed in the API mode, the CPU 20 stops the operation in the CPU 20, and the supply of electric power to the CPU domain. In the recording mode, "CPUHalt" is not employed.

"GPUPowerOn" is the API for starting the supply of electric power to the drawing domain. If "GPUPowerOn" is performed in the API mode, the CPU 20 starts the supply of electric power to the drawing domain.

The kinds of API are not limited to those as shown in FIG. 3, but the needed operations corresponding to the recording mode and the API mode may be defined for various kinds of API.

Returning to FIG. 2, the ROM 30 is a non-volatile memory such as a flash ROM, and stores an operating system program (OS) and an application program such as a viewer for electronic book.

The NVRAM 40 is a non-volatile memory such as FRAM (Ferroelectric Random Access Memory) or an MRAM (Magnetoresistive Random Access Memory). For example, if the contents of electronic book are perused, data needed to store when the power of the information processing apparatus 1 is cut off, such as the page number during perusal, is stored.

The NVRAM 40 may be a non-volatile memory that does not need to be backed up by a battery as described above, or a volatile memory such as SRAM which is backed up by a dedicated battery to make an artificial non-volatile memory.

The RAM 50 is a volatile memory such as DRAM (Dynamic Random Access Memory), SRAM (Static Random Access Memory) or SDRAM (Synchronous DRAM), and forms a work area and stores the processing result when the CPU 20 performs the process.

The GA 60 is a hardware for performing the operation in accordance with the instructions of the CPU 20 in the API mode or recording mode, and performing a drawing process of image displayed on the display 3 at high speed. Specifically, the GA 60 performs a process for expanding a vector graphic inputted from the CPU 20 to a raster graphic. And the GA 60 outputs the graphic undergoing the drawing process as the drawing data to be drawn on the display 3 to the display controller 70. At this time, the GA 60 can directly send the drawing data to the display controller 70, but may once store it in the RAM 50 or the NVRAM 40 and send it. In this case, the drawing data stored in the RAM 50 or the NVRAM 40 may be reused afterwards.

The display controller 70 directly controls the display 3, and displays the drawing data inputted from the GA 60 in the display 3.

Specifically, the display controller 70 displays the raster graphic of drawing object on the display 3 by driving an X driver and a Y driver of the display 3 with reference to the drawing data inputted from the GA 60.

The memory card controller 80 is an interface circuit provided in the memory card slot 9 for reading or writing the data recorded in the memory card in accordance with the instructions of the CPU 20.

The communication controller 90 is an interface circuit provided in the communication connector 8 for transmitting or receiving the information via the communication cable in accordance with the instructions of the CPU 20.

Herein, each functional unit as shown in FIG. 2 has an initialization procedure circuit (not shown) for initializing the internal state after the reset is released by the power management circuit 10. Specifically, this initialization procedure circuit sets a default value in the register holding the information inside each functional unit, if the voltage level of a reset signal line is changed from low level to high level, and transmits an initialization signal in accordance with a predetermined procedure, if an external interface is provided. Thereafter, a READY signal indicating the establishment of a state where the process is executable is sent via the READY signal line to the power management circuit 10.

The operation will be described below.

In the information processing apparatus 1 of this embodiment, with the above configuration, the power is turned on only when the operation is required, such as when an input operation is performed, and after the required operation is ended, the power is cut off again. And when the power is turned on, the operation transits to the process of each functional unit through a predetermined power-on sequence. Further, when the power is turned on, electric power is supplied only to the power management domain that is required to operate in accordance with the substance of an input operation. And when each functional unit performs the operation, the CPU 20 issues an instruction in the recording mode, so that the operation time of the CPU 20 with a great power consumption is made as short as possible. Through these operations, the information processing apparatus 1 prevents the occurrence of unnecessary power consumption, and has a lower power consumption than before.

First of all, the operation where the CPU 20 issues an instruction to the functional unit that is required to operate in the recording mode will be described below. Herein, a case where the CPU 20 issues a drawing instruction to the GA 60 will be described below as an example.

Figure 4:
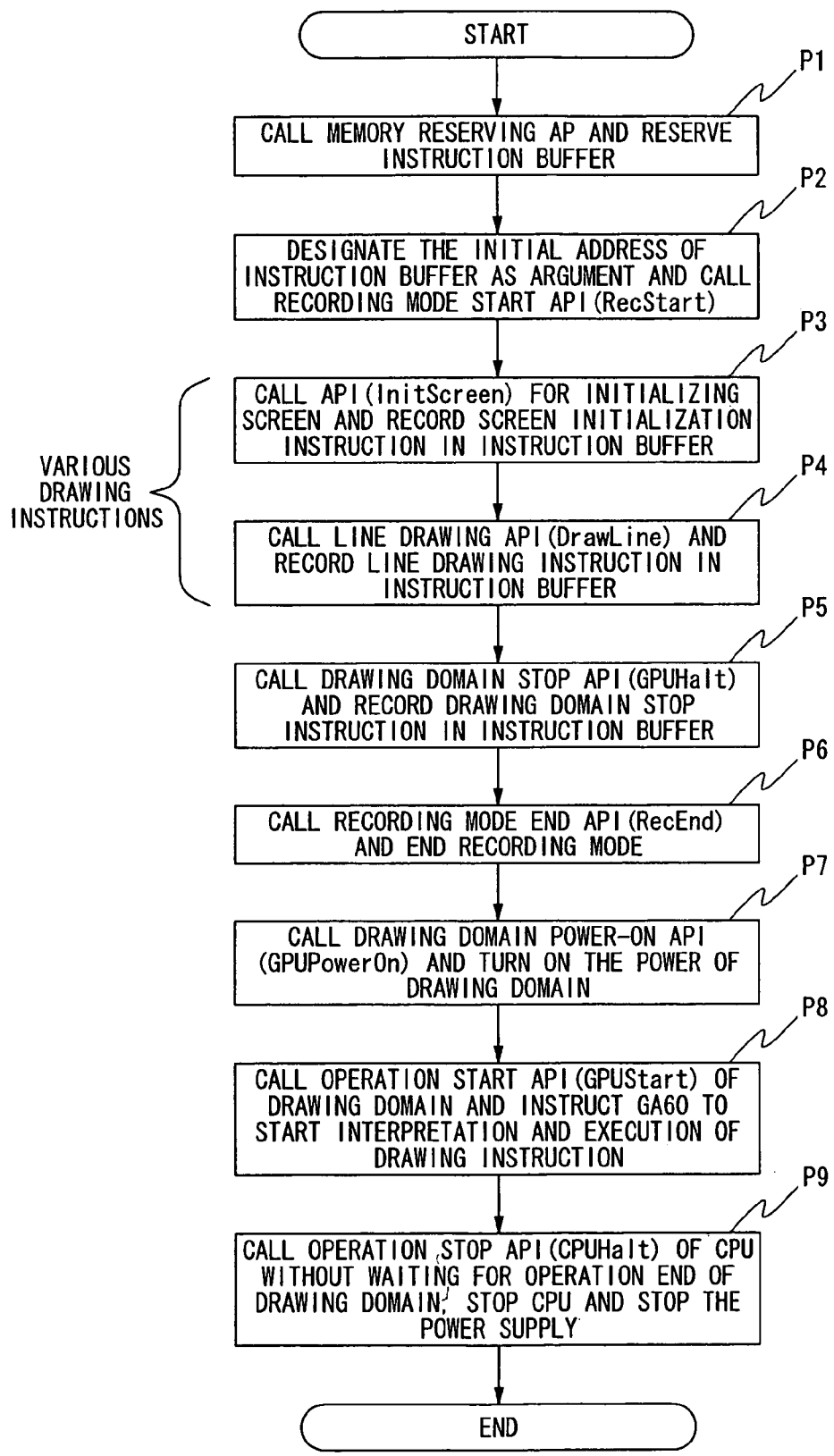
FIG. 4 is a flowchart showing an operation example when the CPU 20 issues an instruction in the recording mode.
Figure 5:
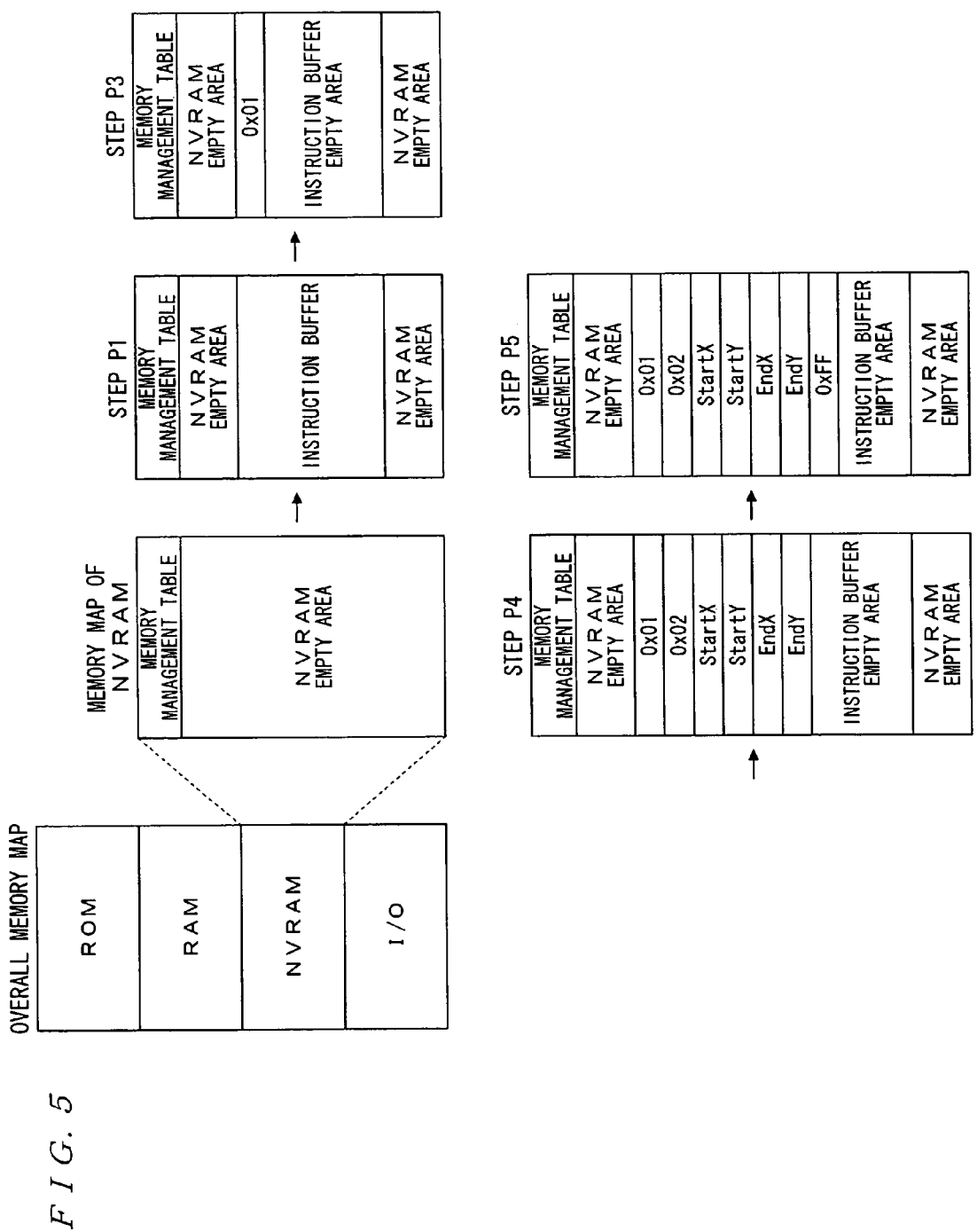
FIG. 5 is a transition diagram of a memory map corresponding to the flowchart as shown in FIG. 4.

FIG. 4 is a flowchart showing an operation example in which the CPU 20 issues an instruction in the recording mode. Also, FIG. 5 is a transition diagram of memory map corresponding to the flowchart as shown in FIG. 4.

In FIG. 4, when the operation is performed in the recording mode, the CPU 20 calls the API for reserving a storage area of the NVRAM 40 (step P1). If this API is called, the initial address (BufferAddress) of the reserved storage area (hereinafter referred to as an "instruction buffer") is returned.

Next, the CPU 20 designates the initial address of the instruction buffer as the argument, and calls the API (RecStart) to start the recording mode (step P2). Thereby, the status of the information processing apparatus 1 transits to the recording mode.

Subsequently, the CPU 20 calls the API (InitScreen) to initialize the screen, and records an initialization instruction of screen in an initial area of the instruction buffer (step P3).

Furthermore, the CPU 20 calls the API (DrawLine) to draw the straight line, and records an instruction of drawing the straight line in a second area following the initial area of the instruction buffer (step P4).

The operation at steps P3 and P4 is only illustrative, and generally, the recording operation with the drawing instruction according to the drawing substance on the screen is inserted into the steps P3 and P4.

And the CPU 20 calls the API (GPUHalt) to stop the supply of electric power to the drawing domain including the GA 60 after drawing the straight line, and records an instruction of stopping the drawing domain in a third area following the second area of the instruction buffer (step P5).

Then, the CPU 20 calls the API (RexEnd) to end the recording mode, and transits from the recording mode to the API mode (step P6).

Next, the CPU 20 calls the API (GPUPowerOn) to start the supply of electric power to the drawing domain, and starts the supply of electric power to the drawing domain including the GA 60 (step P7).

Subsequently, the CPU 20 calls the API (GPUStart) for the GA 60 to start the interpretation and execution of the instruction, and instructs the GA 60 to start the interpretation and execution of instruction (step P8).

Herein, for the drawing instruction currently performed, the CPU 20 calls the API (CPUHalt) to stop the supply of electric power to the CPU domain and stops the operation of the CPU 20, and the supply of electric power to the CPU domain, without waiting for the end of the process in the drawing domain, because the CPU 20 does not need to perform the operation (step P9).

And the operation for issuing the instruction is ended and the process in the drawing domain is performed.

In accordance with this procedure, the CPU 20 issues an instruction when the information processing apparatus 1 is required to perform the operation, whereby the operation time of the CPU 20 with a great power consumption can be as short as possible in the process in which each functional unit performs the operation. For example, the operation time in the functional unit with great power consumption such as GA 60 can be also shortened, whereby the information processing apparatus 1 has an extremely low power consumption than before.

Next, a power-on sequence in the information processing apparatus 1 will be described below.

Figure 6:
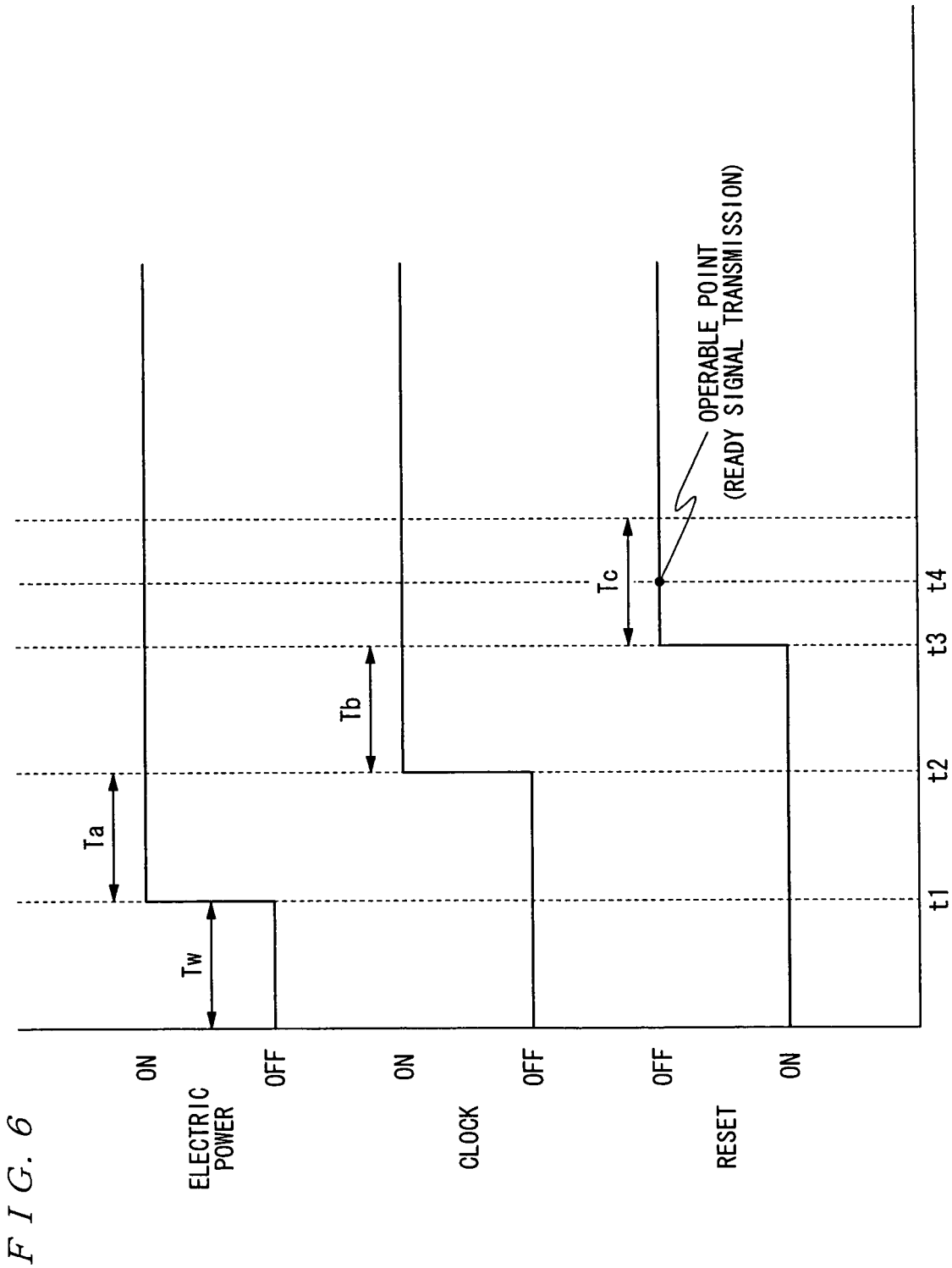
FIG. 6 is a timing chart showing a power-on sequence of turning on the power of each functional unit in the information processing apparatus 1.

FIG. 6 is a timing chart showing the power-on sequence when the power of each functional unit is turned on in the information processing apparatus 1.

Herein, a case where the functional unit to turn on the power is the GA 60 will be described as an example.

In FIG. 6, it is determined that the power management circuit 10 requires the process in the GA 60, electric power is supplied to the drawing domain after waiting for time Tw (time t1).

The waiting time Tw at this time is a timing parameter set to prevent concentration of the rush current.

And the power management circuit 10 starts the supply of clock to each functional unit included in the drawing domain after waiting for a time (time Ta) until the power level is stabilized (time t2).

Subsequently, the power management circuit 10 release the reset for the GA 60 after waiting for a time (time Tb) until the clock signal is stabilized (time t3).

Then, the power management circuit 10 transits to a state of waiting for a time (time Tc) required to perform an initialization procedure for each functional unit.

Herein, the GA 60 sends a READY signal to the power management circuit 10 if the reset is released at time t3 and the initialization of the internal conditions is ended (time t4). The time t4 when the power management circuit 10 receives the READY signal is a use possible point of the GA 60.

Then, the power management circuit 10 outputs a control signal for instructing the GA 60 to perform the process, upon receiving a READY signal from the GA 60.

If the READY signal is not received for the waiting time Tc, the power management circuit 10 outputs the control signal to the GA 60 after the elapse of the waiting time Tc.

Subsequently, the operation in the recording mode and a system control process that occurs in a specific application scene of the power-on sequence will be described below.

Figure 7:
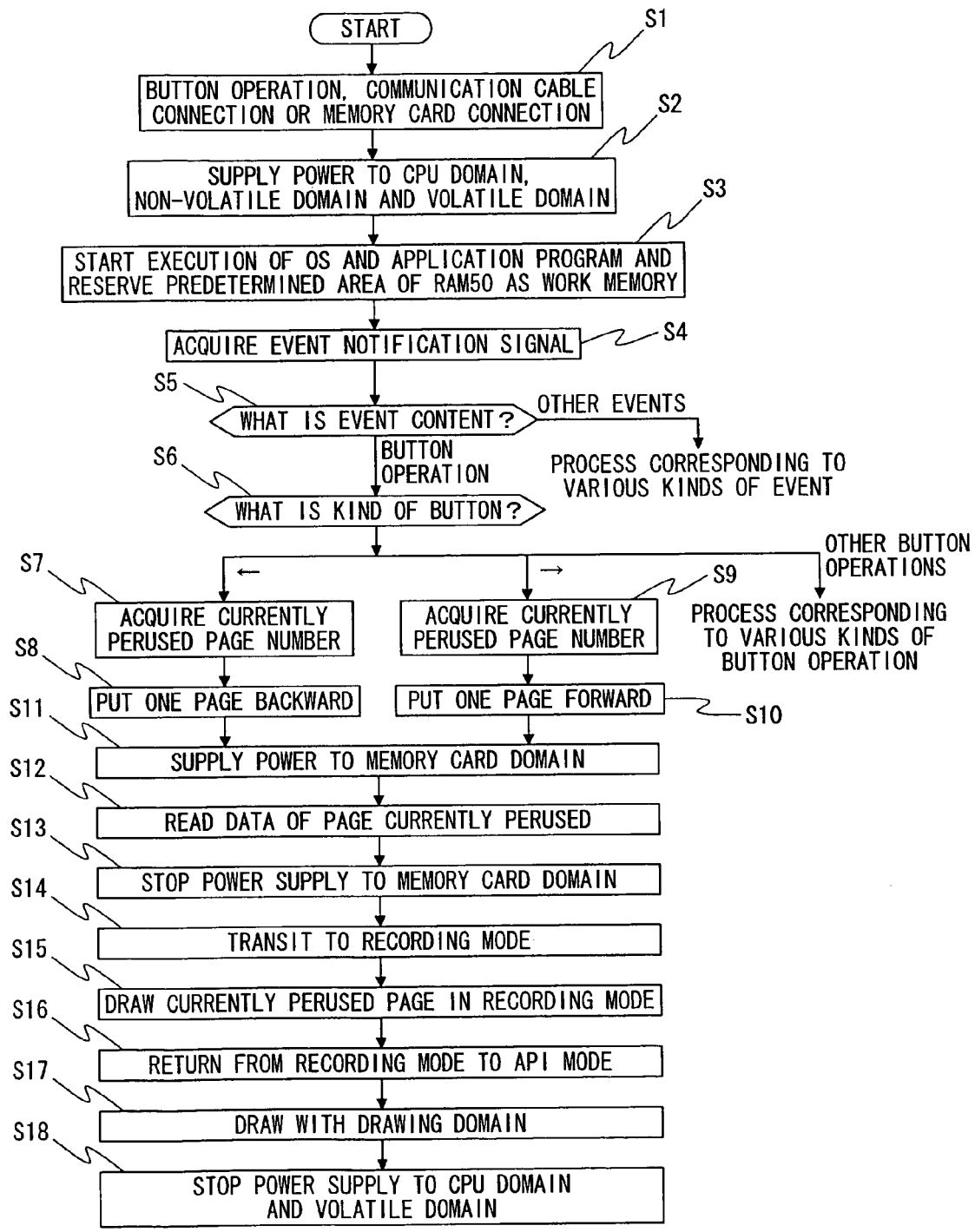
FIG. 7 is a flowchart showing a system control process performed by the information processing apparatus 1.

FIG. 7 is a flowchart showing the system control process performed by the information processing apparatus 1.

Also, FIG. 8 is a view showing the display screen examples in the system control process. In the following, the system control process will be described by appropriately referring to the display screen as shown in FIG. 8.

In FIG. 7, if the user operates any of the buttons, connects the communication cable or connects the memory card (step S1), the power management circuit 10 supplies electric power to the CPU domain, the non-volatile domain and the volatile domain (step S2). At this time, each of the functional units included in the CPU domain, the non-volatile domain and the volatile domain performs the power-on sequence as shown in FIG. 6.

Then, the CPU 20 starts to perform the OS and application program stored in the ROM 30 and reserves a predetermined area of the RAM 50 as a work memory (step S3).

Next, the CPU 20 acquires an event notification signal from the power management circuit 10 (step S4), and determines the substance of an event that has occurred (step S5).

At step S5, if it is determined that the event that has occurred is an input operation on any button, the CPU 20 determines the kind of button operated and inputted (step S6).

At step S6, if it is determined that the page backward button 4 is operated and inputted, the CPU 20 acquires the page number currently perused from the NVRAM 40 (step S7), and puts the currently perused page backward by one page by subtracting "1" from the page number (step S8).

Also, at step S6, if it is determined that the page forward button 5 is operated and inputted, the CPU 20 acquires the page number currently perused from the NVRAM 4 (step S9), and puts the currently perused page forward by one page by adding "1" to the page number (step S10).

After the steps S8 and S10, the power management circuit 10 supplies electric power to the memory card domain (step S11), and reads the data of the new page that is currently perused from the memory card (step S12). At step S11, the power-on sequence as shown in FIG. 6 is performed in the memory card controller 80 included in the memory card domain.

And the power management circuit 10 stops the supply of electric power to the memory card domain (step S13), and performs a transition process to the recording mode (reserving the instruction buffer and calling the API to start the recording mode as indicated at steps P1 and P2 in FIG. 4) (step S14). At this time, each of the functional units included in the drawing domain performs the power-on sequence as shown in FIG. 6.

Then, the CPU 20 performs a process for drawing the currently perused page in the recording mode (process for recording the screen initialization instruction, various drawing instructions and the stop instruction of drawing domain in the instruction buffer as indicated at steps P3 to P5 in FIG. 4) (step S15).

Then, the CPU 20 performs a process for returning from the recording mode to the API mode (calling the API to end the recording mode as indicated at step P6 in FIG. 4) (step S16).

Subsequently, the power management circuit 10 performs a process for enabling the drawing domain to perform the drawing (making the supply of electric power to the drawing domain and interpretation and execution of the drawing instruction as indicated at steps P7 and P8 in FIG. 4) (step S17). Thereby, the currently perused page is displayed (see FIG. 8A).

Thereafter, the power management circuit 10 performs a process for stopping the supply of electric power to the CPU domain and the volatile domain (process for stopping the supply of electric power to the CPU 20 as indicated at step P9 in FIG. 4) (step S18). At step S18, data stored in the NVRAM 40 is held after stopping the supply of electric power.

Herein, though as a part related with the operation in the recording mode, the operation where the page backward button 4 or the page forward button 5 is pressed has been described above, when it is determined that an event other than pressing the button occurs at step 5, or when it is determined that an event of pressing other buttons occurs at step 6, the corresponding operation is performed.

Figure 8E:
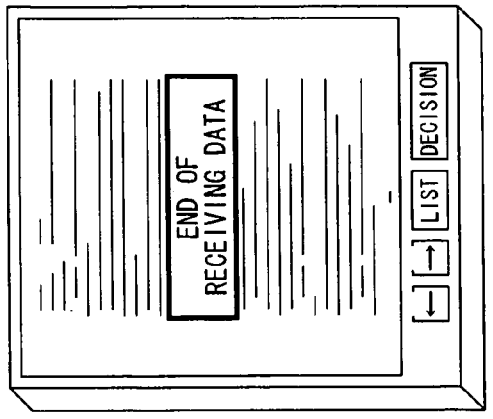
FIGS. 8A-8E show the display screen examples in the system control process.
Figure 8B:
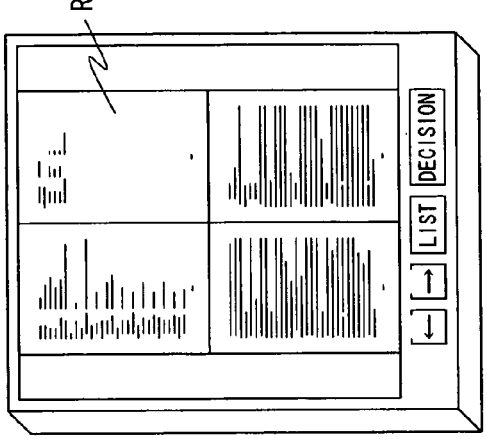
Figure 8D:
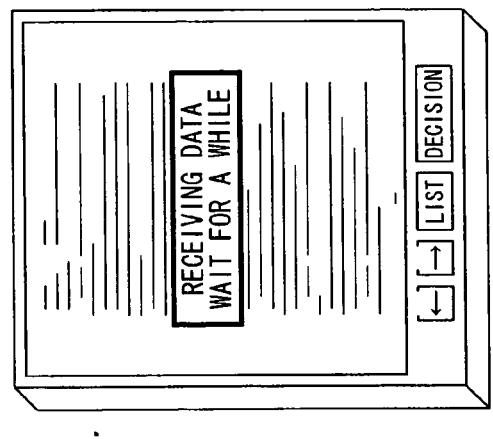
Figure 8A:
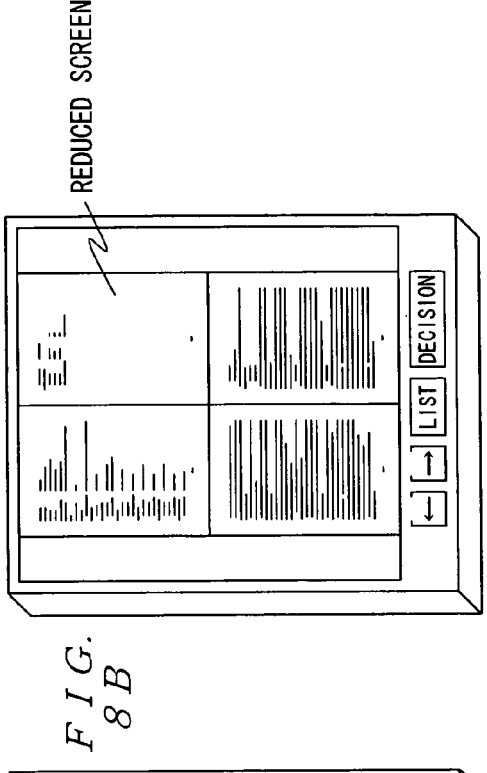
Figure 8C:
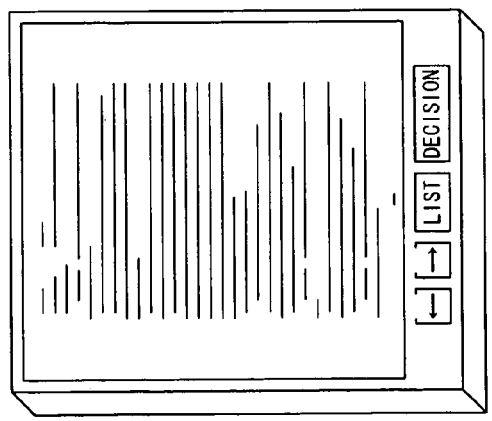

For example, when it is determined that the list display button 6 is operated and inputted at step S6, the CPU 20 supplies electric power to the memory card domain and the drawing domain, reads the reduced screen data for displaying the list, displays the list of reduced screen data (see FIG. 8B), and displays the cursor for selecting the page to be displayed on the currently perused page (see FIG. 8C).

Also, when it is determined that the communication cable is connected at step S5, electric power is supplied to the drawing domain, and the CPU 20 makes an indication that data is being received from the communication cable (see FIG. 8D). If receiving the data from the communication cable is ended, the CPU 20 makes an indication that receiving the data is ended, (see FIG. 8E).

Figure 9A:
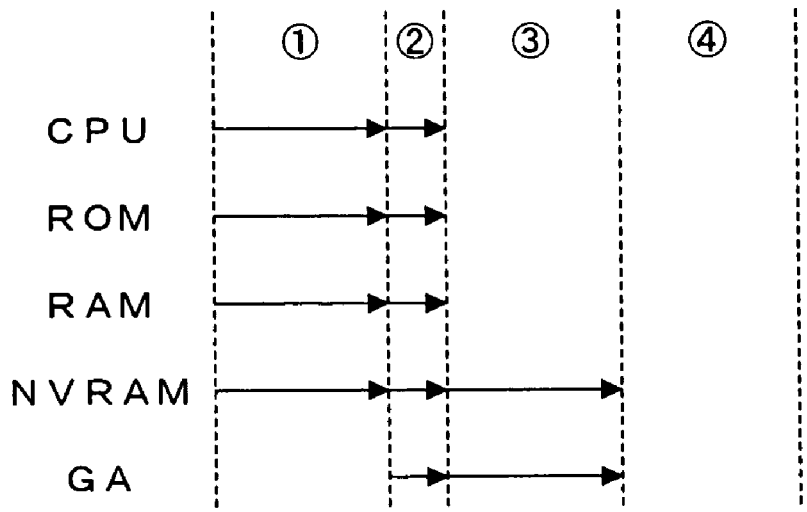
FIGS. 9A-9B show the operation state of each functional unit in performing the process in comparison between the invention and the conventional low power consumption technique.
Figure 9B:
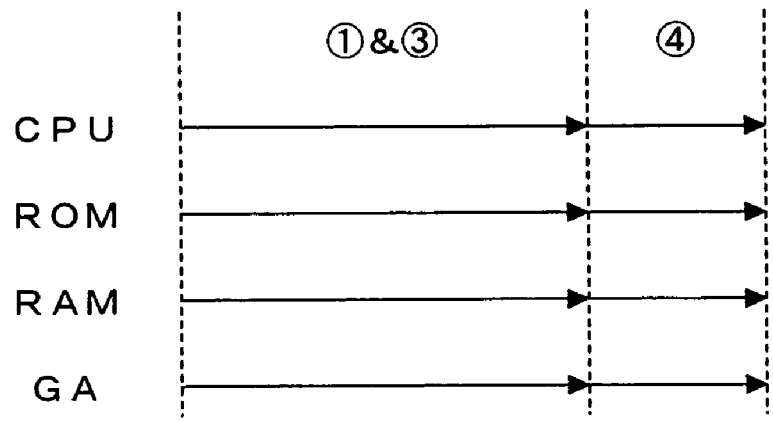

As described above, the information processing apparatus 1 according to this embodiment is fundamentally in a state where no electric power is supplied to each functional unit, and supplies electric power to perform the process only if the operation is required. Also, if the operation is required, the CPU 20 operates in the recording mode, whereby the CPU 20 ends operation upon the end of issuing the instruction concerning the required operation, even if the process is being performed in other functional units, as shown in FIG. 9.

Accordingly, the operation time of the CPU 20 with greater power consumption can be shortened, whereby the lower power consumption is realized than the information processing apparatus to which the conventional low power consumption technique is applied.

Also, when electric power is supplied to the functional unit requiring the operation, the power-on sequence through the supply of electric power, the supply of clock and the release of reset signal is performed, and the READY signal is outputted in the power-on sequence, if each functional unit is ready for the operation.

Accordingly, the information processing apparatus 1 is fundamentally in a state where the power is cut off in each functional unit, and even if the power is turned on repeatedly upon the input operations, the waiting time from turning on the power to starting the process can be shortened, thereby making it possible to perform the process more rapidly.

With this effect, especially for the CPU 20 in which the leak current has the problem, the state where no electric power is supplied is fundamental, whereby the information processing apparatus 1 has an extremely low power consumption.

Also, the information processing apparatus 1 supplies electric power with the power management domain as a unit, it is more beneficial than performing the power control for each functional unit in respect of the circuit scale and the easiness of control. Moreover, the power-on sequence is performed simultaneously in the functional units included in the power management domain, whereby the process is performed more rapidly, than performing the power-on sequence for each functional unit in which the operation is required.

That is, in the information processing apparatus that can autonomously control the supply of electric power, the lower power consumption is realized.

What is claimed is:

1. An information processing apparatus for autonomously controlling the supply of electric power to each functional unit constituting said apparatus, comprising:
    a management part for controlling the supply of electric power to each functional unit;
    an execution control part for issuing an instruction concerning an operation, if the operation is required in the self apparatus; and
    an instruction recording part for recording an instruction issued by said execution control part;
    wherein said management part stops the supply of electric power to said execution control part and starts the supply of electric power to a functional unit concerning the instruction issued by said execution control part, if said execution control part ends issuing the instruction, whereby said functional unit executes the instruction recorded in said instruction recording part; and
    wherein said execution control part executes the operation via an application program interface of built-in basic software by switching a recording mode in which the issued instruction is recorded in said instruction recording part and an API mode in which the issued instruction is sequentially executed in said functional unit in accordance with a designation.

2. The information processing apparatus according to claim 1, wherein said instruction recording part comprises a non-volatile memory that holds the recorded information to be non-volatile.

3. The information processing apparatus according to claim 1, wherein in supplying electric power to said functional unit concerning the instruction issued by said execution control part, said management part performs a power-on sequence starting the supply of electric power to said functional unit, supplying a clock to said functional unit after the supply of electric power is stabilized, changing a reset signal indicating the possibility of the operation to said functional unit into a state where the operation is permitted, and subsequently inputting a control signal instructing the execution of said process into said functional unit, said functional unit comprises a READY signal transmitting means for transmitting a READY signal indicating that said functional unit is ready to perform the process after said reset signal is changed to the state where the operation is permitted by said management part, and said management part changes said reset signal for said functional unit concerning the instruction issued by said execution control part to the state where the operation is permitted in said power-on sequence, then inputs said control signal into said functional unit upon receiving the READY signal from said READY signal transmitting means provided in said functional unit, and stops the supply of electric power to said functional unit upon the end of the process.

4. The information processing apparatus according to claim 3, wherein said management part is fundamentally in a state where no electric power is supplied to each of the functional units including said execution control part, in which if the process in any of said functional units is required, said power-on sequence is performed for said execution control part, and if said execution control part ready for execution of the process issues an instruction to other functional units, said power-on sequence is performed for said functional unit of concern.

5. The information processing apparatus according to claim 1, wherein a plurality of power management domains comprising said predetermined functional units are made up as control units for supplying the electric power, and if the process in predetermined functional unit is required, said management part supplies electric power to every power management domain comprising said functional unit.

6. An information processing method for autonomously controlling the supply of electric power to each functional unit constituting said apparatus, comprising:

issuing an instruction concerning an operation and recording the issued instruction, if the operation is required in the self apparatus;

stopping the supply of electric power to a functional unit issuing the instruction upon the end of issuing said instruction and starting the supply of electric power to the functional unit concerning said issued instruction to perform the instruction recorded in said functional unit; and executing the operation via an application program interface of built-in basic software by switching a recording mode in which the issued instruction is recorded and an API mode in which the issued instruction is sequentially executed in accordance with a designation.

7. The information processing method according to claim 6, wherein:

in supplying electric power to said functional unit concerning the instruction issued, performing a power-on sequence starting the supply of electric power to said functional unit, supplying a clock to said functional unit after the supply of electric power is stabilized, changing a reset signal indicating the possibility of the operation to said functional unit into a state where the operation is permitted, and subsequently inputting a control signal instructing the execution of said process into said functional unit;

said functional unit transmits a READY signal indicating that said functional unit is ready to perform the process after said reset signal is changed to the state where the operation is permitted by said management part; and after said reset signal for said functional unit concerning the instruction issued by said execution control part is changed to the state where the operation is permitted in said power-on sequence, said control signal is input into said functional unit upon receiving the READY signal, and the supply of electric power to said functional unit is stopped upon the end of the process.

8. The information processing apparatus according to claim 7, wherein said management part is fundamentally in a state where no electric power is supplied to each functional unit, in which if the process in any of said functional units is required, said power-on sequence is performed for said execution control part, and if said execution control part ready for execution of the process issues an instruction to other functional units, said power-on sequence is performed for said functional unit of concern.

* * * * *